United States Patent [19]

Boyd

[11] 3,973,976

[45] Aug. 10, 1976

[54] HIGH INDEX OPHTHALMIC GLASSES

[75] Inventor: David C. Boyd, Corning, N.Y.

[73] Assignee: Corning Glass Works, Corning, N.Y.

[22] Filed: Nov. 7, 1975

[21] Appl. No.: 629,798

Related U.S. Application Data

[63] Continuation-in-part of Ser. No. 475,665, June 3, 1974, abandoned.

[52] U.S. Cl. ............................ 106/53; 106/47 Q
[51] Int. Cl.² ............... C03C 3/10; C03C 3/30; C03C 3/08
[58] Field of Search ..................... 106/53, 47 Q

[56] References Cited

UNITED STATES PATENTS

| | | | |
|---|---|---|---|
| 3,303,399 | 2/1967 | Hoogendoorn et al. | 106/53 |
| 3,369,961 | 2/1968 | Dalton et al. | 106/53 |
| 3,653,933 | 4/1972 | Tsunekawa | 106/47 Q |
| 3,801,336 | 4/1974 | Upton | 106/47 Q |
| 3,888,692 | 6/1975 | Kuwayama | 106/53 |

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

This invention relates to soft, low expansion, high durability, high refractive index glasses especially suitable for the production of segments or buttons for multifocal ophthalmic lenses and, in particular, photochromic ophthalmic lenses. The glasses demonstrate refractive indices between about 1.58–1.71, softening points between about 630°–675°C., strain points between about 450°–500°C., good chemical durability, and coefficients of thermal expansion (25°–300°C.) between about 45–60 × $10^{-7}$/°C. The glasses consist essentially, by weight on the oxide basis, of about 3–7% $B_2O_3$, 3–11% $Al_2O_3$, 30–60% PbO, and 27–55% $SiO_2$.

2 Claims, No Drawings

HIGH INDEX OPHTHALMIC GLASSES

REFERENCE TO RELATED APPLICATION

This application is a continuation-in-part of my copending application Ser. No. 475,665, filed June 3, 1974, now abandoned.

Multifocal ophthalmic lenses are manufactured by sealing one or more small segments or buttons of a high refractive index glass into a recess in a major lens blank molded from a crown glass in a manner well-known to the ophthalmic glassmaking art. Hence, in conventional practice, the major lens blank is made from a spectacle crown glass having a refractive index of 1.523 and the segment or button glass has a higher refractive index, commonly in the range of 1.57–1.71, the selection thereof being dependent upon the degree of visual correction demanded in the finished multifocal lens.

A recent development in the ophthalmic lens field has involved the introduction of photochromic lenses. Photochromic glasses, or phototropic glasses as such have been variously called, are described in U.S. Pat. No. 3,208,860, the basic patent in the field. As is explained therein, photochromic glasses darken under the influence of actinic radiation, normally ultraviolet radiation, and will return to the clear state when the actinic radiation is removed. Such glasses, index-corrected to 1.523, have been, and are presently being, marketed as ophthalmic lenses by Corning Glass Works under the registered trademarks PHOTOGRAY and PHOTOSUN.

Up to the present time, these glasses have been marketed as "single vision" lenses, i.e., as a single lens having a refractive index of 1.523. Hence, there has been a need for a higher refractive index glass which could be sealed to the major lens blank of photochromic glass to yield a multifocal lens. Such a glass would exhibit a softening point between about 630°–675°C., a strain point between about 450°–500°C., and a coefficient of thermal expansion (25°–300°C.) between about 45–60 × $10^{-7}$/°C. to insure satisfactory fusing to the photochromic major lens blank while developing a low stress level seal therebetween, as well as possessing the complicated matrix of physical characteristics demanded of an ophthalmic glass.

Lead flint glasses were originally devised to serve as higher index segments for multifocal lenses. Examples of such glasses are illustrated in U.S. Pat. No. 2,528,634. Barium flint glasses have also been developed for that purpose and examples of those can be found in U.S. Pat. Nos. 2,523,264, 2,523,265, and 2,523,266. The compositions disclosed in those patents have been proven very useful for the ophthalmic glass industry. Nevertheless, such have not been suitable for sealing to photochromic glasses of the type mentioned above marketed by Corning Glass Works of Corning, New York, under designations of Corning 8097 and 8098, since the softening temperatures thereof are too high and/or the coefficients of thermal expansion are too high.

Therefore, the primary objective of the instant invention is to provide glasses having a refractive index between about 1.58–1.71, a softening point of about 630°–675°C., a strain point of about 450°–500°C., and a coefficient of expansion of about 45–60 × $10^{-7}$/°C. thereby rendering them particularly suitable as segments for ophthalmic, multifocal photochromic spectacles.

This objective can be achieved with glasses consisting essentially, by weight on the oxide basis, of about 3–11% $Al_2O_3$, 3–7% $B_2O_3$, 30–60% PbO, and 27–55% $SiO_2$. These glasses are not photochromic in themselves. However, inasmuch as the button comprises but a small part of the composite multifocal lens, it does not materially detract from the photochromic character supplied by the major lens blanks when sealed thereto.

Although operable glasses can be produced employing the simple quaternary system, various metal oxides are preferably included to aid in melting and forming the glass, improving the chemical durability, altering the refractive index, etc. For example, minor additions of $La_2O_3$ can steepen the viscosity curve of the glass and increase the acid durability thereof, while retaining or even raising the refractive index. These additions permit the $B_2O_3$ content to be increased to result in an overall softening of the glass at the temperature where it is sealed to the photochromic major, while maintaining an adequately high strain point and a sufficiently low coefficient of thermal expansion to secure a low stress level in the seal. In general, the total of $La_2O_3$ will be held below about 6%. BaO in amounts up to about 10% can be substituted for PbO. Such substitutions will maintain the high refractive index and beneficially increase the dispersion of the glass. However, BaO hardens the glass so an excess must be avoided to insure satisfactory fusion of the segment to the photochromic major. Upon to about 3% total of $Na_2O$ and/or $Li_2O$ can be useful in optimizing sealing characteristics although some caution must attend their use inasmuch as their presence tends to raise the coefficient of thermal expansion of the glass. $TiO_2$ behaves similarly to $La_2O_3$ with respect to the viscosity of the glass and the improvement in durability. Nevertheless, more than about 3% $TiO_2$ significantly limits the transmission of ultraviolet radiation through the segment which, in turn, inhibits the photochromic reaction in the major.

In summary, useful additions to the quaternary base glass include: up to 6% $La_2O_3$, up to 10% BaO, up to 3% $Li_2O$ and/or $Na_2O$, and up to 3% $TiO_2$. In no event, however, will the sum of all constituents outside of the base quaternary exceed about 10%.

A careful balance is required to be maintained between the $Al_2O_3$ and $B_2O_3$ contents. At least 3% $Al_2O_3$ is demanded to attain a liquidus below 1100°C., but the presence of $Al_2O_3$ adversely hardens the glass at fusing temperatures. That effect can be offset through additions of $B_2O_3$.

U.S. Pat. Nos. 2,393,448 and 3,493,405 disclose glass compositions similar to those operable in the instant invention. The former patent describes glasses having very low power factors, viz., less than 0.07%, temperature coefficients less than 100 parts per million/°C., and high dielectric constants rendering them especially suitable for electrical insulating components. The latter patent discusses glasses suitable for encapsulating semiconductor devices.

The glasses of the former are alkali-free, and consist essentially, by weight, of 5–15% $Al_2O_3$, 5–65% $B_2O_3$, 20–40% PbO, and 10–50% $SiO_2$. Such broad ranges do, indeed, overlap the straitly-defined limits of the present invention. However, there is no suggestion of utilizing such glasses as high refractive index ophthalmic segments suitable for multifocal photochromic lenses and no working example recited therein even closely approaches the compositions demanded in the instant invention.

The glasses of the latter patent are also alkali-free and consist essentially, by weight, of 4–15% $Al_2O_3$, 0–15% $B_2O_3$, 45–60% PbO, 25–40% $SiO_2$, and 2–8% ZnO. Here, again, there is no disclosure of the utility of those glasses as high refractive index segments for ophthalmic multifocal photochromic lenses and, furthermore, ZnO is cited as a required component. As is shown infra, the inclusion of ZnO in the glasses of the present invention so deleteriously affects the chemical durability thereof as to preclude their utility as ophthalmic buttons.

Finally, U.S. Pat. No. 3,801,336 is stated to disclose glass compositions specifically designed to perform as segments for ophthalmic photochromic glass lenses. The compositions described therein contained about 18–30% $B_2O_3$, 20–32% $SiO_2$, 31.5% PbO, 9.6% $Al_2O_3$, 2.2% BaO, 0–3% $TiO_2$, 0–5% $La_2O_3$, and 4.8% ZnO. Such glasses are obviously outside the $Al_2O_3$ and $B_2O_3$ ranges of the present invention and, furthermore, contain ZnO, an unwanted component in the instant glasses.

Table I reports approximate compositions for a group of glasses, expressed in parts by weight on the oxide basis, which are operable in the present invention. The batch ingredients therefor can consist of any materials, either the oxides or other compounds, which, upon being melted together, will be converted to the desired oxide in the proper proportion. The batch ingredients were carefully blended together and then run into platinum crucibles. The crucibles were placed into a furnace operating at 1400°–1500°C. and the batch melted for 4 hours. The melts were stirred for one hour to remove cords, seeds, and other inhomogeneities. The melts were poured into steel molds to yield square glass slabs about b × 6 × ½ inches and these slabs immediately transferred to an annealer operating at about 550°C.

The table also records the standard viscosity-temperature measurements of softening point (Soft. Pt.), annealing point (Ann. Pt.), and strain point (Str. Pt.), each in °C., the coefficient of thermal expansion over the range 25°–300°C. (Exp.), density in g/cc, refractive index ($n_D$), liquidus temperature (liq.) in °C., the power factor (P.F.) determined at one megacycle at room temperature, the dielectric constant (D.C.) determined at one megacycle at room temperature, and the temperature coefficient (T.C.) over the range of room temperature to 100°C. in P.P.M./°C. Each of these values was determined utilizing techniques conventional in the glass art. A measure of the chemical durability in terms of weight loss in mg/cm$^2$ (Wt. Loss) and in appearance is also tabulated.

The chemical durability of the instant glasses was evaluated utilizing a test method standard in the ophthalmic industry denominated as the AO test. The procedure contemplates five general steps. First, the surface area of a glass sample (normally polished) is measured. Second, the sample is weighed. Third, the sample is immersed into a 10% by weight aqueous solution of HCl for 10 minutes at 25°C. Fourth, the sample is withdrawn from the HCl solution, washed, and dried. Fifth, the sample is reweighed and the difference in weight calculated as "weight loss" in mg/cm$^2$ of sample surface. Any haze, irridescence, or other surface phenomenon is observed visually.

A weight loss of no more than about 0.03 mg/cm$^2$ with no surface imperfection noted visually is conventionally deemed required to successfully pass that test. Hence, under Appearance, N.C. designates no change and Irid. indicates iridescence observed.

Arsenic oxide and/or antimony oxide constituted the fining agent (F.A.), for the recited glasses. Other fining agents known to the glassmaking art could be substituted therefor.

TABLE I

|  | 1 | 2 | 3 | 4 | 5 | 6 | 7 | 8 | 9 | 10 |
|---|---|---|---|---|---|---|---|---|---|---|
| $SiO_2$ | 39.8 | 37.6 | 34.5 | 46.7 | 44.3 | 45.6 | 34.6 | 36.3 | 36.3 | 36.3 |
| $B_2O_3$ | 3.8 | 5.3 | 4.0 | 4.3 | 6.1 | 6.1 | 5.0 | 4.4 | 4.4 | 4.4 |
| $Al_2O_3$ | 3.9 | 3.9 | 8.0 | 4.4 | 4.4 | 3.2 | 6.9 | 5.8 | 5.8 | 5.8 |
| PbO | 52.4 | 53.2 | 53.0 | 43.2 | 43.7 | 43.6 | 53.0 | 53.0 | 50.0 | 47.0 |
| $Na_2O$ | — | — | — | 1.5 | 1.5 | 1.5 | — | — | — | — |
| $Li_2O$ | — | — | 0.2 | — | — | — | 0.2 | 0.2 | 0.2 | 0.2 |
| $La_2O_3$ | — | — | — | — | — | — | — | — | 3.0 | 6.0 |
| F.A. | 0.3 | 0.3 | 0.3 | 0.3 | 0.3 | 0.3 | 0.3 | 0.3 | 0.3 | 0.3 |
| Soft. Pt. | 674 | 646 | 664 | 683 | 655 | 648 | 640 | 646 | 663 | 682 |
| Ann. Pt. | 495 | 475 | 495 | 495 | 487 | 482 | 480 | 480 | 501 | 521 |
| Str. Pt. | 451 | 441 | 458 | 458 | 453 | 447 | 447 | 442 | 466 | 486 |
| Exp. | 46.7 | 53.2 | 51.4 | — | — | — | 52.3 | 52.4 | 51.3 | 50.8 |
| Density | — | — | 3.943 | — | — | — | 3.947 | 3.934 | 3.909 | 3.886 |
| $n_D$ | 1.65 | 1.66 | 1.6602 | 1.61 | 1.61 | 1.61 | 1.662 | 1.657 | 1.657 | 1.658 |
| Liq. | 1090 | 1035 | 750 | 1050 | 985 | 1060 | — | 872 | 945 | 995 |
| Wt. Loss | 0.01 | 0.01 | 0.01 | 0.01 | 0.01 | 0.01 | 0.01 | 0.02 | 0.01 | 0.01 |
| Appear. | N.C. | N.C. | N.C. | N.C. | N.C. | N.C. | N.C | N.C. | N.C. | N.C. |
| P.F. | — | — | — | — | — | — | — | — | — | — |
| D.C. | — | — | — | — | — | — | — | — | — | — |
| T.C. | — | — | — | — | — | — | — | — | — | — |

|  | 11 | 12 | 13 | 14 | 15 | 16 | 17 | 18 | 19 | 20 |
|---|---|---|---|---|---|---|---|---|---|---|
| $SiO_2$ | 47.4 | 36.8 | 48.88 | 37.62 | 38.5 | 32.6 | 46.9 | 49.2 | 38.5 | 28.9 |
| $B_2O_3$ | 6.6 | 4.85 | 6.3 | 5.85 | 3.0 | 2.4 | 6.1 | 6.4 | 4.6 | 5.5 |
| $Al_2O_3$ | 6.3 | 5.85 | 4.1 | 2.95 | 4.8 | 4.4 | 6.3 | 6.3 | 5.9 | 9.7 |
| PbO | 34.6 | 49.0 | 38.6 | 53.05 | 53.0 | 59.3 | 32.6 | 32.0 | 46.5 | 50.1 |
| $Na_2O$ | 0.6 | — | 0.61 | 0.03 | 0.7 | — | 0.61 | 0.6 | — | — |
| $Li_2O$ | 1.2 | 0.2 | 1.21 | 0.2 | — | — | 1.21 | 1.2 | 0.2 | 0.2 |
| $La_2O_3$ | 3.0 | 3.0 | — | — | — | 3.0 | — | 2.0 | 2.0 | 1.7 |
| BaO | — | — | — | — | — | — | 6.0 | — | — | — |
| $TiO_2$ | — | — | — | — | — | — | — | 2.0 | 2.0 | 2.8 |
| $ZrO_2$ | — | — | — | — | — | — | — | — | — | 0.5 |
| F.A. | 0.3 | 0.3 | 0.3 | 0.3 | — | 0.3 | 0.3 | 0.3 | 0.3 | 0.5 |
| Soft. Pt. | 660 | 663 | 672 | 675 | 662 | 661 | 665 | 672 | 675 | 658 |

TABLE I-continued

| | | | | | | | | | | |
|---|---|---|---|---|---|---|---|---|---|---|
| Ann. Pt. | 488 | 498 | 490 | 500 | 485 | 507 | 496 | 495 | 508 | 514 |
| Str. Pt. | 454 | 463 | 455 | 461 | 451 | 469 | 465 | 461 | 472 | 479 |
| Exp. | 48.0 | 51.5 | 48 | 52 | 53.7 | 57.2 | 51.3 | 46.3 | 48.6 | 52.7 |
| Density | 3.29 | 3.91 | 3.27 | 3.89 | — | 4.317 | 3.287 | 3.150 | 3.742 | 4.025 |
| $n_D$ | 1.5882 | 1.653 | 1.588 | 1.6524 | 1.653 | 1.7074 | 1.5897 | 1.590 | 1.654 | 1.700 |
| Liq. | 1017 | 971 | — | — | 907 | 841 | 958 | 1024 | 969 | 914 |
| Wt. Loss | 0.01 | <0.01 | <0.01 | <0.01 | 0.01 | 0.03 | <0.01 | <0.01 | 0.01 | 0.03 |
| Appear. | N.C. | N.C. | N.C. | N.C. | N.C. | N.C | N.C. | N.C. | N.C. | N.C. |
| P.F. | 0.25% | 0.17% | — | — | — | — | — | — | — | — |
| D.C. | 6.75 | 8.3 | — | — | — | — | — | — | — | — |
| T.C. | ~1000 | ~1000 | — | — | — | — | — | — | — | — |

Table II reports glass compositions, melted and formed in like manner to those set forth in Table I, but which are close but outside the ranges prescribed in the instant invention. A comparison of the resultant properties clearly illustrates the criticality of the compositional parameters which must be observed to achieve the desired physical properties. Hence, even very minor modifications can alter the viscosity relationship, the chemical durability, the liquidus, etc. of the glass.

TABLE II

| | 21 | 22 | 23 | 24 |
|---|---|---|---|---|
| $SiO_2$ | 41.0 | 32.6 | 34.3 | 25.0 |
| $B_2O_3$ | 3.8 | 5.0 | 0.4 | 16.6 |
| $Al_2O_3$ | 2.8 | 6.9 | 4.4 | 15.2 |
| PbO | 52.4 | 53.0 | 60.9 | 43.3 |
| $Li_2O$ | — | 0.2 | — | — |
| ZnO | — | 2.0 | — | — |
| F.A. | 0.3 | 0.3 | 0.3 | — |
| Soft. Pt. | 671 | 630 | 679 | 650 |
| Ann. Pt. | 495 | 478 | 518 | 510 |
| Str. Pt. | 458 | 444 | 483 | 478 |
| Exp. | 45.5 | 60.3 | 57.4 | 47.9 |
| Density | — | 4.039 | 4.392 | 1.635 |
| $n_D$ | 1.64 | 1.67 | 1.706 | |
| Liq. | 1270 | — | — | — |
| Wt. Loss | 0.01 | 0.03 | 0.02 | 0.29 |
| Appear. | N.C. | Irid. | N.C. | Irid. |

As can be observed, glasses 1–20 exhibit the necessary physical properties for ophthalmic elements. Such glasses also demonstrate high power factors and temperature coefficients. Example 11 having a $n_D$ of 1.5882, Example 12 having a $n_D$ of 1.653, and Example 20 having a $n_D$ of 1.700 provide three index steps which are especially useful as segments in multifocal ophthalmic lenses. Their melting and forming behavior, coupled with their physical properties, including chemical durability, recommend them for preferred compositions. Seal stress upon fusion to Corning 8097 photochromic glass is essentially nil.

U.S. Pat. No. 3,303,399 discloses glasses suitable for encapsulating semiconductor devices having compositions within the ternary system $PbO-B_2O_3-SiO_2$ wherein $Al_2O_3$ may be included as an optional component. U.S. Pat. No. 3,369,961 describes glasses suitable for sealing to KOVAR and molybdenum metals having compositions within the alkali metal oxide-$Al_2O_3$-$B_2O_3$-PbO-$SiO_2$ quinary system. Table III records two further glass compositions, expressed in weight percent on the oxide basis, which are close to, but outside of, the ranges demanded for operable glasses in the present invention. Composition A comprises Example 5 reported in Table I of U.S. Pat. No. 3,369,961, and Composition B consists of the examples set forth in lines 42–47, column 7, of U.S. Pat. No. 3,303,399.

The physical property measurements secured on the two glasses again demonstrate the criticality of maintaining composition parameters to obtain the desired products.

TABLE III

| | A | B |
|---|---|---|
| $SiO_2$ | 55.5 | 28.9 |
| $Al_2O_3$ | 4.5 | 3.9 |
| $B_2O_3$ | 5.0 | 9.6 |
| PbO | 30.0 | 57.1 |
| $TiO_2$ | — | 0.5 |
| $Na_2O$ | 2.0 | — |
| $K_2O$ | 2.0 | — |
| $Li_2O$ | 0.5 | — |
| $As_2O_3$ | 0.5 | — |
| Soft. Pt. | 689 | 576 |
| Ann. Pt. | 484 | 462 |
| Str. Pt. | 445 | 436 |
| Exp. | 53.2 | 57.6 |
| $n_D$ | 1.554 | 1.691 |
| Wt. Loss | 0.02 | 0.15 |
| Appear. | N.C. | Irid. |

As can be seen, the softening point of Example A is too high but, even more importantly, the refractive index is too low, thereby rendering the glass unacceptable for the ophthalmic application of the instant invention. Example B is too soft, i.e., the softening point and strain point temperatures are too low, plus the chemical durability is too poor for ophthalmic applications.

I claim:

1. An ophthalmic glass exhibiting a refractive index between about 1.58–1.71, a softening point between about 630°–675°C., a strain point between about 450°–500°C., a coefficient of thermal expansion (25°–300°C.) between about 45–60 × $10^{-7}$/°C., and no surface imperfection with a weight loss of no more than about 0.03 mg/cm² after immersion into a 10% by weight aqueous solution of HCl for 10 minutes at 25°C. consisting essentially, by weight on the oxide basis, of about 3–7% $B_2O_3$, 3–11% $Al_2O_3$, 30–60% PbO, and 27–55% $SiO_2$.

2. A glass according to claim 1 also containing up to 6% $La_2O_3$, up to 10% BaO, up to 3% $Li_2O$ and/or $Na_2O$, and up to 3% $TiO_2$, the sum of all such additions constituting no more than 10% of the total composition.

* * * * *

UNITED STATES PATENT AND TRADEMARK OFFICE
CERTIFICATE OF CORRECTION

PATENT NO. : 3,973,976
DATED : August 10, 1976
INVENTOR(S) : David C. Boyd

It is certified that error appears in the above-identified patent and that said Letters Patent are hereby corrected as shown below:

Column 3, line 37, "b x 6 x 1/2" should be -- 6 x 6 x 1/2 --.

Signed and Sealed this

Ninth Day of November 1976

[SEAL]

Attest:

RUTH C. MASON
Attesting Officer

C. MARSHALL DANN
Commissioner of Patents and Trademarks